United States Patent [19]

Hautala

[11] Patent Number: 5,145,072
[45] Date of Patent: Sep. 8, 1992

[54] METHOD FOR SCREENING AND TREATING PULP
[75] Inventor: Jouko Hautala, Tampere, Finland
[73] Assignee: Oy Tampella AB, Tampere, Finland
[21] Appl. No.: 707,644
[22] Filed: May 30, 1991

Related U.S. Application Data
[62] Division of Ser. No. 379,998.

[30] Foreign Application Priority Data
Aug. 4, 1988 [FI] Finland .................................. 883649

[51] Int. Cl.⁵ .................................................. B07B 1/20
[52] U.S. Cl. ..................................... 209/273; 162/55; 162/261
[58] Field of Search ............... 209/234, 273, 305, 306; 210/403, 404, 413, 414, 415; 162/55, 261, 380

[56] References Cited

U.S. PATENT DOCUMENTS

| | | | |
|---|---|---|---|
| 791,566 | 6/1905 | Meyer | 209/306 |
| 2,983,379 | 5/1961 | Cram | 209/273 |
| 3,791,917 | 2/1974 | Bolton, III | 162/55 |
| 3,997,441 | 12/1976 | Pamplin, Jr. | 210/415 |
| 4,911,828 | 3/1990 | Musselmann et al. | 209/273 |
| 4,913,806 | 4/1990 | Hillström et al. | 209/273 |

FOREIGN PATENT DOCUMENTS

| | | | |
|---|---|---|---|
| 212785 | 3/1987 | European Pat. Off. | |
| 52-32175 | 3/1977 | Japan | 210/414 |
| 1335602 | 9/1987 | U.S.S.R. | 162/55 |

Primary Examiner—W. Gary Jones
Assistant Examiner—Todd J. Burns
Attorney, Agent, or Firm—Ladas & Parry

[57] ABSTRACT

The invention relates to a method and a device for screening and treating pulp. In the invention, the pulp is screened in a screen into an accepted fraction and a rejected fraction, the rejected fraction being treated after the screening by removing water from it. In order to reduce the energy consumption of the refining process, the rejected pulp fraction is screened by means of a means (13) rotating rapidly in a reject space (12) of a screen (1) in such a manner that the rapidly rotating means (13) effects a radial flow of the fine-grained material contained in the rejected fraction outwards through a perforated wall (14) surrounding the rotating means (13) into a space (15, 15a) from where the fine-grained material is discharged.

2 Claims, 2 Drawing Sheets

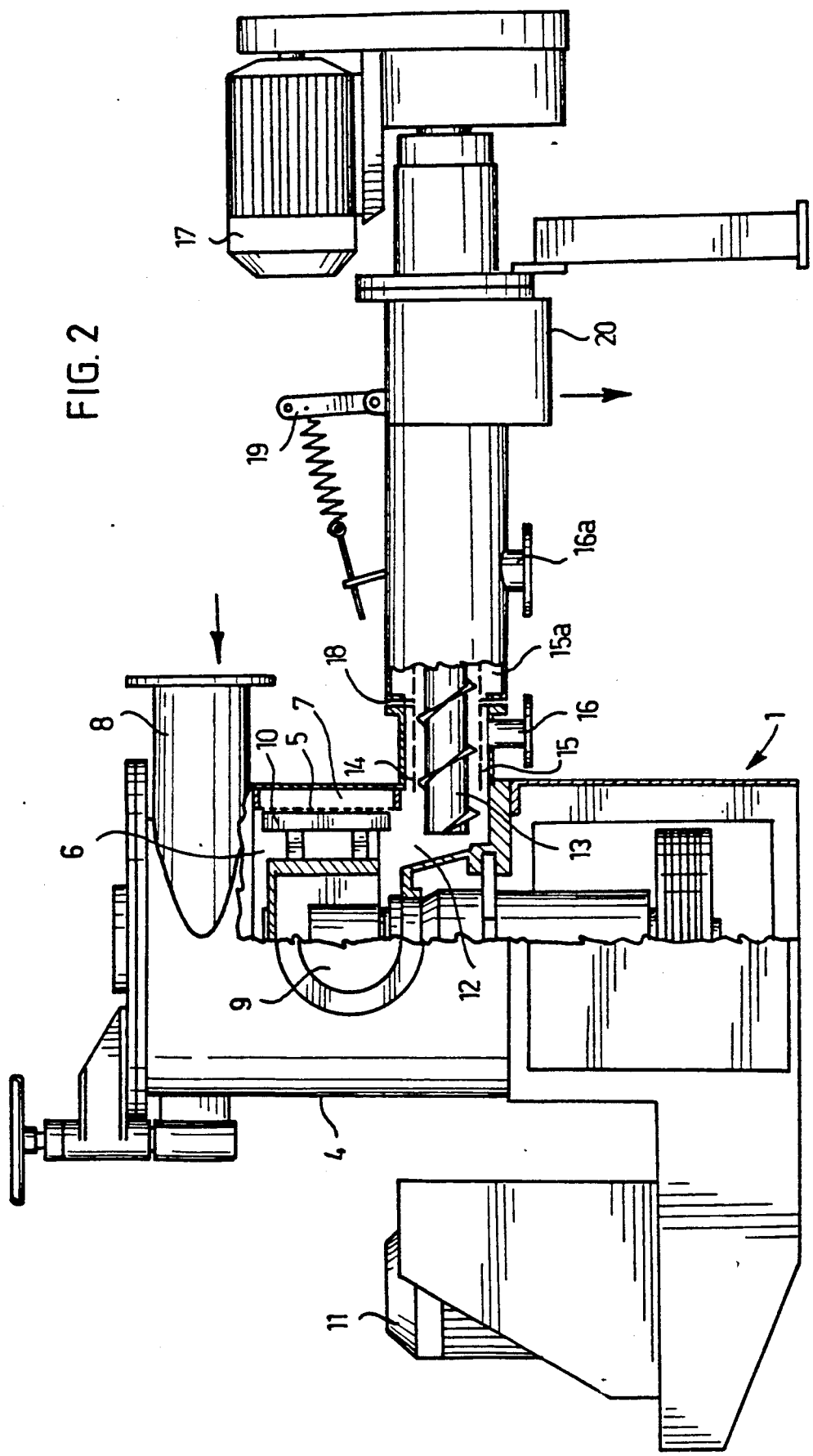

METHOD FOR SCREENING AND TREATING PULP

"This is a divisional of copending application Ser. No. 07/379,998 filed on July 14, 1989, now U.S. Pat. No. 5,051,168.

The invention relates to a method of screening and treating pulp, wherein pulp is introduced into a screen so as to be screened into an accepted and a rejected fraction, the rejected fraction being treated after the screening by removing water from it. The invention is also concerned with a device for screening and treating pulp.

The screening and treating of pulp for refining, for instance, is a prior art technique in wood processing industries. In the prior art, pulp is introduced into a screen in which it is divided into an accepted fraction and a rejected fraction. The rejected fraction, called reject, is treated for the refining. The reject is thereby normally passed into an intermediate container where it is agitated. From the intermediate container, the reject is pumped through pre-precipitation into a second intermediate container in which it is again agitated. From the second intermediate container, the reject is pumped into press means and further through the feeding means of the refiner into the refiner. The function of the press means is to remove water from the reject. The press means can consist of, e.g., a screw press or a band press or both of them. From the refiner, the pulp is usually passed into a separate screen, wherefrom the reject returns to the refining.

Attempts have been made to simplify this process, as it is complicated and requires plenty of space and has high investment costs. A further drawback of this prior art technique is that the pulp to be refined contains only about 20% of material which should be refined. The refining of excess material involves high consumption of energy during refining. As mentioned above, various attempts have been made to improve the process. Prior art solutions include the device disclosed in EP Patent Application 86303932.7 (publication number 0212785). By means of this device, the cost of investment and the space requirement have been reduced as compared with the process described above. However, the device of the EP Patent Application still has the drawback that it involves unnecessary refining of reject. In the EP Patent Application, reject is passed from the reject space of the screen into a screw press disposed outside the screen, where a desired amount of water is removed from the reject.

The object of the invention is to provide a method and a device by means of which the drawbacks of the prior art are eliminated. This is achieved by means of a method and a device according to the invention. The method is characterized in that the rejected pulp fraction is screened by means of a means rotating rapidly in a reject space of a screen in such a manner that the rapidly rotating means effects a radial flow of fine-grained material contained in the rejected fraction outwards through a perforated wall surrounding the rotating means into a space from where the fine-grained material is discharged.

The device according to the invention, in turn, is characterized in that the means for treating the rejected fraction comprise a rapidly rotating means placed at least partially in a reject space of the screen, and a perforated wall surrounding the rapidly rotating means, the rapidly rotating means being arranged to effect a radial flow of fine-grained material contained in the rejected fraction outwards through a perforated wall surrounding the rotating means into a space from where the fine-grained material is discharged.

A major advantage of the invention is that the screening and treatment of pulp can be carried out more simply than in the prior art. Also, the refining costs are lower than previously because only that portion of the pulp is refined which actually requires refining.

In addition, the device according to the invention can be advantageously designed in such manner that the rejected fraction or reject can be discharged from the screen at the refining consistency (10 to 30%), whereby the reject can be passed directly to the refiner or to its feeding means without any auxiliary means.

In the following the invention will be described by means of the preferred embodiments shown in the attached drawings, wherein FIG. 1 illustrates generally a realization of the method according to the invention;

FIG. 2 shows a first embodiment of the device according to the invention;

Figure 1:
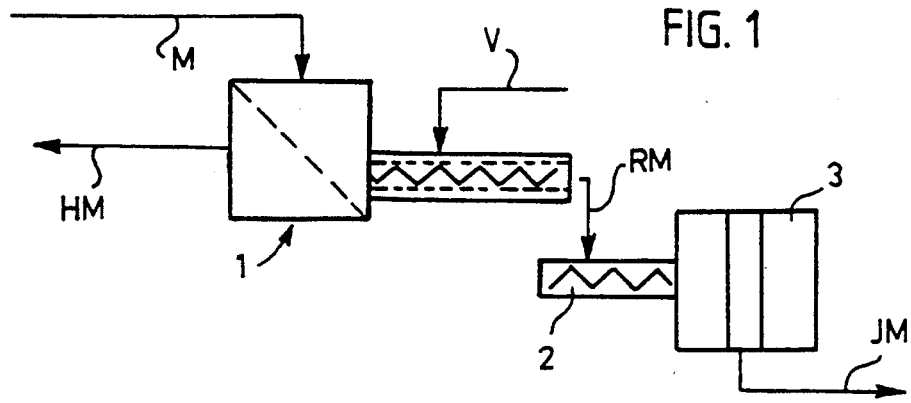

FIG. 1 shows generally an arrangement applying the method according to the invention. The reference numeral 1 indicates generally a screen according to the invention. The reference numeral 2 indicates feeding means in a refiner indicated with the reference numeral 3. The introduction of pulp into the screen 1 is shown by the arrow M. The discharge of accepted pulp is shown by the arrow HM. The reject flowing into the refiner is indicated with the arrow RM, and the refined pulp flowing away from the refiner with the arrow JM. The feeding of diluting water is indicated generally with the arrow V. Refined pulp JM can be passed either back into the screen 1 or into a separate screen.

As appears from FIG. 1, the device applying the method according to the invention is very simple, as when discharged from the screen the rejected fraction has a consistency such that it can be passed directly into the refiner without any intermediate steps.

FIG. 2 is a general enlarged view of the screen 1. The screen 1 comprises a body 4 in which a screen member 5 is disposed so as to divide the inner space of the body into a filtrate space 6 and an accept space 7 for accepted fraction. A pulp feeding connection 8 and an accept discharge connection are fitted in the body 4. Furthermore, a rotor 10 is provided within the body 4, and the rotor is rotated by means of a motor 11. A reject space 12 for rejected fraction is provided at the bottom of the body 4. The reject space receives material which does not pass through the screen member into the accept space 7.

According to the invention, the reject space 12 is provided with means 13 for screening and thickening the reject. A perforated wall 14 is provided around said means 13. The means 13 is arranged to rotate in a space defined by the wall 14 at a rate such that the fine-grained material contained in the reject flows under the influence of the rotation movement radially outwards through the perforated wall 14 into a space 15 from where the fine-grained material is removed via a connection 16, for instance. The wall 14 thereby acts as a screening cylinder.

The rapidly rotating means 13 is rotated by means of a suitable motor 17. As used herein, the expression "rapidly rotating" means that the rate of rotation of the means 13 is high as compared with that of the screw press, for instance. As mentioned above, the rotation of the means 13 causes the fine-grained material to flow through the openings of the wall 14, whereby the reject is screened apart. The screening can be made more efficient by feeding diluting water at one or more points 18 in the longitudinal direction of the means 13.

The space 15 need not consist of a single space, but several successive spaces can be used as well. In the example of FIG. 2, two successive spaces 15 and 15a are used. The fine-grained material passed into the space through the wall 14 are thereby removed through a connection 16a.

In this way, the proportion of fine-grained material obtained is smaller than that obtained with the proper screen. In addition, the rapidly rotating means 13 can be operated in such a manner that the pulp is thickened by means of the terminal portion of the means 13 to the desired refining consistency, that is from 10 to 30%. The thickening process can be adjusted by varying the back pressure in a discharge opening 20 by means of a flap of a pressure adjusting device 19 provided in the discharge opening 20.

As is apparent from the above description, the rapidly rotating means 13 according to the invention aims at keeping the filtrate, that is the accept from the space 15, 15a, as impure as possible so that it contains as much fine-grained material as possible. So the operation is the complete reverse of that of conventional screw thickeners, in which the aim is to keep the filtrate from the screw as pure as possible.

Figure 3:
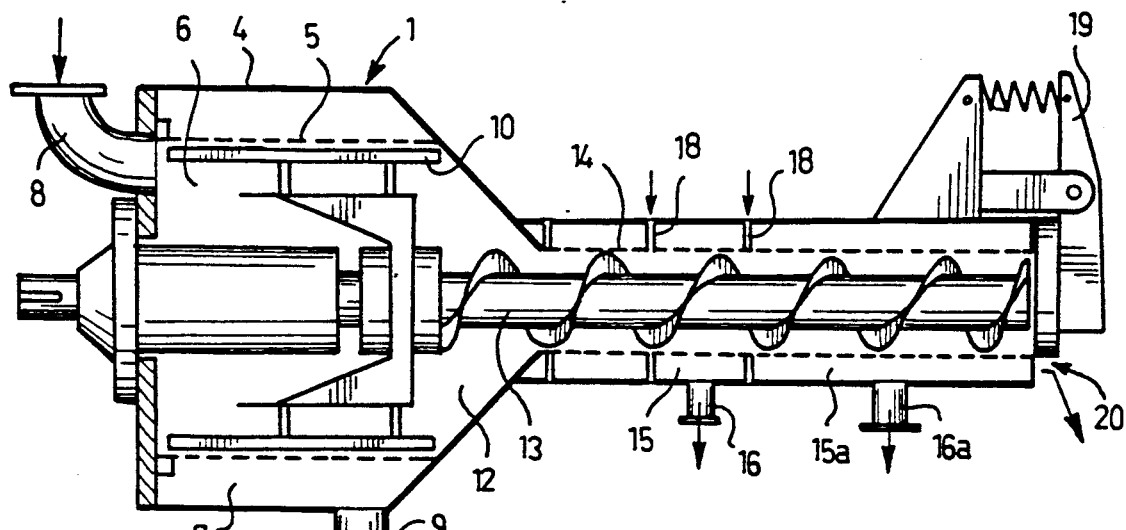
FIG. 3 shows a second embodiment of the device according to the invention.

FIG. 3 shows the second embodiment of the screen of the invention. In FIG. 3, the same reference numerals as in FIG. 2 are used for corresponding parts. The structure and operation of the embodiment of FIG. 3 are similar to those of the embodiment of FIG. 2. The only difference is that in the embodiment of FIG. 3 the rapidly rotating means 13 is mounted on the same shaft as the rotor 10 of the screen. Thereby one motor only can be used in place of the two motors of the embodiment of FIG. 2.

Figure 4:
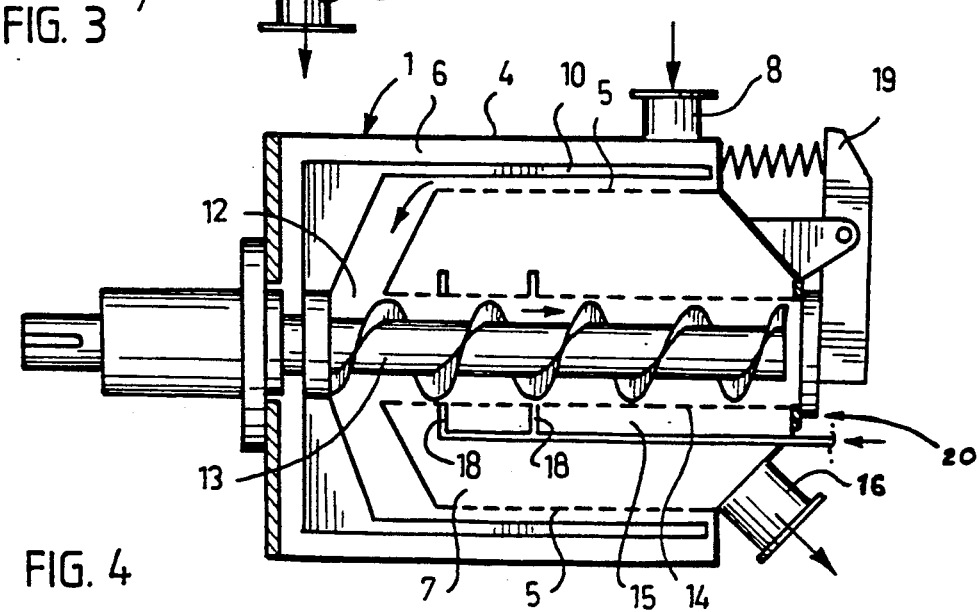
FIG. 4 shows a third embodiment of the device according to the invention.

FIG. 4 shows the third embodiment of the screen according to the invention. In FIG. 4, the same reference numerals as in FIGS. 2 and 3 are used for corresponding parts. The embodiment of FIG. 4 differs from that of FIG. 3 in that in the embodiment of FIG. 4 the rapidly rotating means 13 and the perforated wall 14 surrounding it are fitted wholly within the screen 1 so that the screen and the rapidly rotating means have a common accept space. In this embodiment, all accept is discharged through the same discharge opening 16.

The embodiments described above are by no means intended to restrict the invention, but the invention can be modified as desired within the scope of the claims. Accordingly, it is obvious that the screen according to the invention or its parts need not be exactly similar to those shown in the figures but realizations of other types are possible as well. For instance, the rapidly rotating means need not necessarily be a screwlike member, as in the figures. Essential is that the means effects a radial flow of fine-grained material through the wall 14. Even though the invention has been described above with reference to pulp to be refined, this is not the only possible application. The invention is applicable to other pulp kinds as well, including reject from machine screens or reject lines.

I claim:

1. A method of screening and treating pulp comprising passing the pulp into a screening device for screening and separating the pulp into an accepted fraction and a rejected fraction, direction the rejected fraction into a reject space and directly onto a rotating screwlike means, said screwlike means extending from within said reject space into a filtrate space, advancing the rejected fraction axially along said screwlike means from said reject space into said filtrate space while effecting a radial flow of fine-grained material contained within the rejected fraction outwardly through a perforated wall beginning within said filtrate space and surrounding the screwlike means within said filtrate space for collecting the fine-grained material, and collecting the remainder of the rejected fraction advanced along the screwlike means.

2. A method according to claim 1 including advancing the remainder of the rejected fraction along the screwlike means against a barrier for squeezing the remainder of the rejected fraction to a desired consistency, and thereafter removing the barrier for collecting the so-squeezed remainder.

* * * * *